United States Patent [19]

Saperstein

[11] Patent Number: 5,894,563
[45] Date of Patent: Apr. 13, 1999

[54] METHOD AND APPARATUS FOR PROVIDING A PCI BRIDGE BETWEEN MULTIPLE PCI ENVIRONMENTS

[75] Inventor: William A. Saperstein, San Carlos, Calif.

[73] Assignee: Apple Computer, Inc., Cupertino, Calif.

[21] Appl. No.: 08/752,888

[22] Filed: Nov. 20, 1996

[51] Int. Cl.⁶ ................................ G06F 13/00
[52] U.S. Cl. .................. 395/309; 395/308; 395/306
[58] Field of Search ....................... 395/308, 309, 395/306, 882, 412; 711/202

[56] References Cited

U.S. PATENT DOCUMENTS

| 5,450,576 | 9/1995 | Kenedy | 395/650 |
|---|---|---|---|
| 5,623,697 | 4/1997 | Bland et al. | 395/842 |
| 5,634,013 | 5/1997 | Childers et al. | 395/280 |
| 5,664,117 | 9/1997 | Shah et al. | 395/280 |
| 5,680,556 | 10/1997 | Begun et al. | 395/311 |
| 5,682,512 | 10/1997 | Tetrick | 711/202 |
| 5,715,419 | 2/1998 | Szczepanek et al. | 711/212 |
| 5,734,850 | 3/1998 | Kenny et al. | 395/309 |

Primary Examiner—Ayaz R. Sheikh
Assistant Examiner—Ario Etienne
Attorney, Agent, or Firm—Mark A. Aaker

[57] ABSTRACT

A special bridge device provides a level of isolation between two independent but compatible bus environments such that only addresses and transactions directed to the other environment are passed through, together with associated data and control information. The device includes address and transaction remapping between the two environments.

During an initialization phase, this device presents itself to the host system as a simple bus device. In one preferred embodiment, the special bridge presents itself as a mass storage or memory device. The host computer performs the minimal setup for such a device. During initialization of the second bus environment, the special bridge device again presents itself only as a simple device, and preferably is not presented as a bus device to the second system at all.

During system operation, the special bus device passes selected addresses, transactions, and data between the two bus environments but in general allows each bus environment to operate independently of the other.

17 Claims, 4 Drawing Sheets

METHOD AND APPARATUS FOR PROVIDING A PCI BRIDGE BETWEEN MULTIPLE PCI ENVIRONMENTS

FIELD OF THE INVENTION

This invention is directed to the field of bridge devices for connecting more than one computer environment. In particular, this invention is directed to a bridge chip that can interface between two PCI environments, each primarily under the control of a different microprocessor.

BACKGROUND OF THE INVENTION

It is quite common for a system to be designed to include a microprocessor connected directly or indirectly to a bus for auxiliary cards. Typical examples include NuBus devices connected to Motorola 68 k or Motorola or IBM PowerPC microprocessors and ISA bus devices connected to Intel or other x86 microprocessors. Such devices have been used in personal computers since at least about 1983. Recent computers have made increasing use of the PCI bus in combination with a number of different microprocessors. Millions of computers are made each year using the PCI bus.

Design of PCI-based computer systems is described in many documents including, for example, the PCI Local Bus 2.1 specification, PCI Special Interest Group, Jun. 1, 1995 (PO Box 14070, Portland OR 97214). Representative designs and techniques are well known in the art.

By far and away, the most common architecture of a PCI computer system uses a single microprocessor connected to a memory controller and memory and to one or more PCI bridge devices. Each PCI bridge device is typically connected to a local PCI bus with a plurality of PCI slots, often three or more. Devices in these slots can communicate between themselves on the local PCI bus and can communicate with main memory and/or with the microprocessor and other system functions through the PCI bridge chip. System I/O devices such as keyboard, monitor, and disk storage may be connected variously on the processor side or on the PCI side of the bridge chip. Communication between a first PCI device on a first PCI local bus and a second PCI device on a second PCI local bus, not directly connected to the first, can be managed through each bus's respective bridge chips. PCI buses can be arranged in hierarchies as well by inserting a PCI to PCI bridge chip on a first PCI local bus to provide a branch or leaf PCI bus as an adjunct to the first PCI local bus. Such architectures and the manufacture of appropriate bridge chips are well understood in the art.

Part of the initialization sequence of a PCI-based computer involves testing each PCI device installed in the system and allocating a certain address space. Any device in the system that has need to communicate with a given PCI device need only direct instructions to the address space for that device. The initialization sequence is described in more detail in the PCI specification, esp. Chapter 6.

Some systems have been designed with multiple microprocessors. Examples include the Macintosh 9500/180 MP, with two PowerPC processors from Apple Computer (Cupertino, Calif.), and similar offerings from Daystar (Atlanta, Ga.) and Umax (Taiwan). Computers with multiple x86, particularly Pentium Pro, microprocessors are available from other vendors. Taking for example the Apple 9500/180 MP, each of the two microprocessors are connected to have access to the system bus and main memory. Any interaction between either microprocessor and a PCI device must flow through the system bus and an appropriate PCI bridge, and PCI local bus.

Another, much less common, design using multiprocessors is to provide a coprocessor of some sort. While special purpose chips such as DSP or special rendering engines are often included as coprocessors, such devices or usually designed into the main architecture of the computer system or included as cards that can be inserted into the bus, e.g. as a PCI device, and share access with the computer system as would any other PCI device.

Still less common are devices which include a separate microprocessor, to some extent independent of the primary microprocessor. A common form of such a device is a sub-computer, often built on a single card, which includes a microprocessor, memory control, I/O control and bus control as appropriate for the card-microprocessor such that the card-microprocessor is able to function essentially independently of the primary system microprocessor. For example, Apple Computer, Cupertino, Calif., has sold a "DOS Compatibility Card" since about 1994, a card including an x86 or compatible microprocessor and sufficient support chips to allow the x86 to function in a system which is built around a Motorola 680x0 or a PowerPC microprocessor. Early cards were designed to connect to the main system bus with a variety of schemes to share certain system elements, such as keyboard, mouse, display, storage devices and to some extent main memory.

Apple's newest PC Compatibility Cards are built as PCI card devices, to plug into a PCI slot and to interact with primary system resources and, to the extent needed, the main processor, through PCI protocols. However, the PC side of the card has its own PCI bus. This leads to an interesting problem in initializing the overall computer system. When the PowerPC side initializes, each PCI device is examined so appropriate memory spaced can be allocated. When the PC side initializes, it needs to do exactly the same thing. It is preferred that no memory addresses be assigned in these various PCI buses which are in conflict with each other. However, it is undesirable to allow the host computer, the PowerPC in this embodiment, to assign addresses in the PC device's local PCI environment, particularly since the PC will try to initialize its own local PCI environment and assign its own addresses. At a minimum this is likely to require reallocation of at least some PCI addresses. At worst, this could cause some significant system thrashing as the two microprocessors try to arbitrate an addressing scheme, and could even cause the system to hang or freeze.

There is a need for some way to bring up multiple PCI environments within a single system without unnecessary steps in the boot process. This has been provided with the method and apparatus of this invention.

SUMMARY OF THE INVENTION

A special PCI-to-PCI bridge device provides a level of isolation between two independent PCI environments such that only addresses and transactions directed to the other environment are passed through, together with associated data and control information. The device includes address and transaction remapping between the two environments.

During an initialization phase, this device presents itself to the host system as a simple PCI device. In one preferred embodiment, the special bridge presents itself as a mass storage or memory device. The host computer performs the minimal setup for such a device and turns to other devices in the system.

At an appropriate stage of initialization, the special bridge device can allow, coordinate, or initiate a boot of the second processor system. In a preferred embodiment, the second processor controls its local bus environment to the almost complete exclusion of the host processor. Where the second processor is a "PC" processor, the special bridge device initiates a reset of the PC microprocessor. This reset involves booting the PC sub-system. Once again, the special bridge device presents itself as a PCI device. In a preferred embodiment, the device is reported as present but not configurable.

Once booted, the special bridge acts as a translator. A transaction originating in either the host or coprocessor environment but destined for the other environment will include an address for the transaction. The address spaces in each environment do not need to be the same and in general are not. Therefore, the special bridge remaps each transaction, as appropriate, for the correct address in the target memory space. The special bridge may provide other special functions, such as driving certain PCI control lines, as described in more detail below.

It is one object of this invention to provide a bridge between two bus environments but at the same time provide sufficient isolation so that each bus environment can operate smoothly without confusion by the other environment.

This and other objects and advantages of the invention, as well as the details of an illustrative embodiment, will be more fully understood from the following specification and drawings.

DESCRIPTION OF THE PREFERRED EMBODIMENTS

Figure 1:
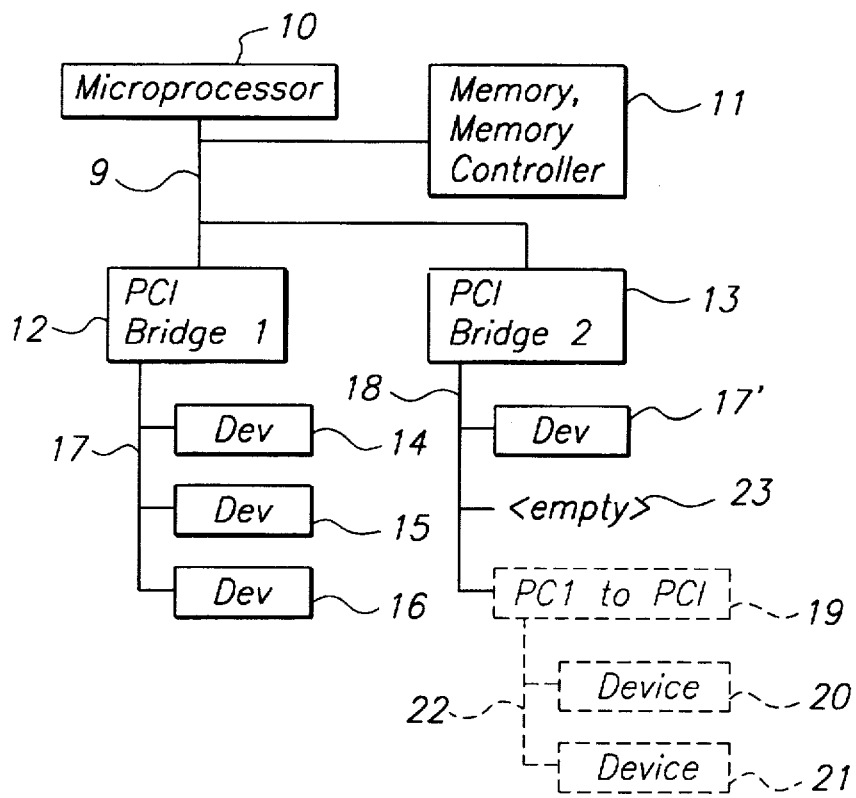
FIG. 1 illustrates a conventional PCI-based computer system.

The specialized bridge chip of this invention provides at least two unique functions. During initialization, the bridge presents itself as a simple device, not a bridge, and hence isolates each of the PCI environments from the other. At run time, the bridge acts as a translator, mapping addresses and transactions in one environment to addresses and transactions in the other environment, and vice versa.

In a traditional PCI system, microprocessor 10 is connected through a main system bus 9 to memory subsystem 11 (with memory controller and memory) and one or more PCI bus bridge devices 12 and 13. PCI devices 14, 15, 16 are connected together on local PCI bus 17 and to PCI bridge 12. Similarly, second PCI bridge 13 connects through local PCI bus 18 to slots for device 17, empty slot 23, and PCI-to-PCI bridge 19, which in turn connects to devices 20, 21. Video in and video out (e.g. a monitor) (not shown) often are connected to the PCI bus, e.g. 17. A number of commercial PCI cards are available to provide this functionality.

When this system initializes, at some point a PCI bus master tests each connected PCI device and extracts information from the device's Configuration Space registers. This includes information such as type of device and memory allocation request for the device. A device may include an initialization sequence which might include a program sequence to be performed at initialization time, for example a driver-load sequence to be executed or loaded into main memory. Many devices, however, require little more than proper allocation of memory to function in the system.

PCI bus bridge 12 coordinates testing and initialization of devices 14, 15, 16. Similarly, second PCI bus bridge 13 coordinates testing and initialization of devices 17 and 19. PCI-to-PCI bridge 19 forwards transactions to local PCI bus 22 and brings up devices 20, 21. The system allocates unique memory addresses to each of the PCI devices according to the requests of the devices. Since the tree is hierarchical second bus bridge 13 manages calls from and to the system and any device directly or indirectly connected to that bridge. Note that during initialization the system must identify any bridge and probe each PCI device connected to that bridge and allocate address space accordingly.

In general, the memory requested is allocated to each PCI device. The device must then latch in the granted memory range and use this for subsequent analysis of communication over the PCI bus. Transactions directed to that memory range are recognized by that target.

Figure 2:
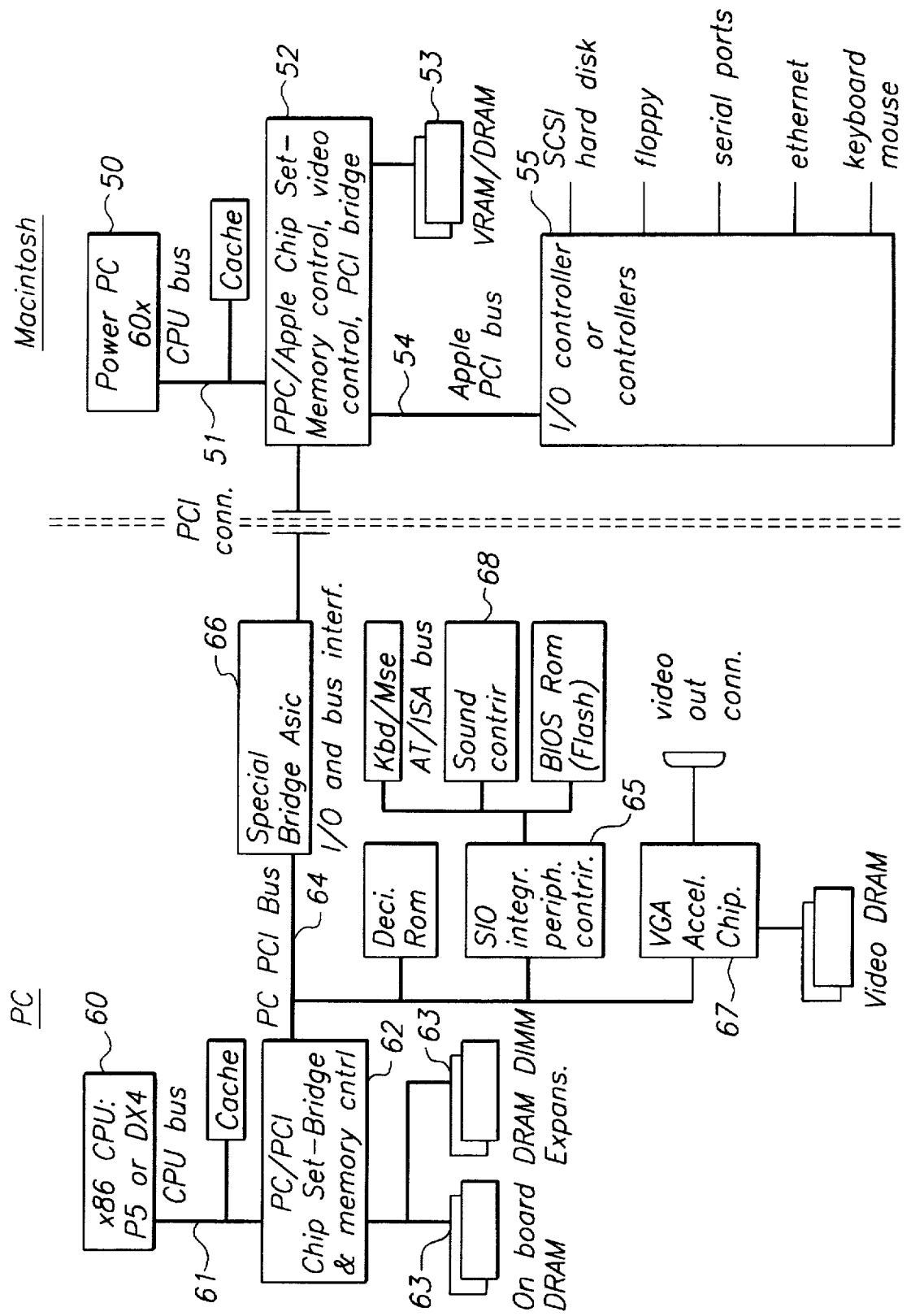
FIG. 2 illustrates a high level block diagram for a system including both a host PowerPC processor and a secondary x86 processor.

In the present invention, the host side of the system looks very much like that shown in FIG. 1. Referring now to FIG. 2, microprocessor 50 is connected through system bus 51 to system support devices, shown as a single block 52 but including a memory controller, video control (in this instance) and a PCI bridge equivalent to bridge 12 in FIG. 1. The PCI bridge is connected in turn to host PCI bus 54 with, as shown, only two other PCI devices. One PCI device is an I/O manager 55 capable of managing network services, keyboard and mouse, and various media storage devices. This may be only one or several separate PCI devices. The other PCI device shown is special PCI bridge chip 66. Similar, corresponding elements are found on the coprocessor side as illustrated.

Figure 3:
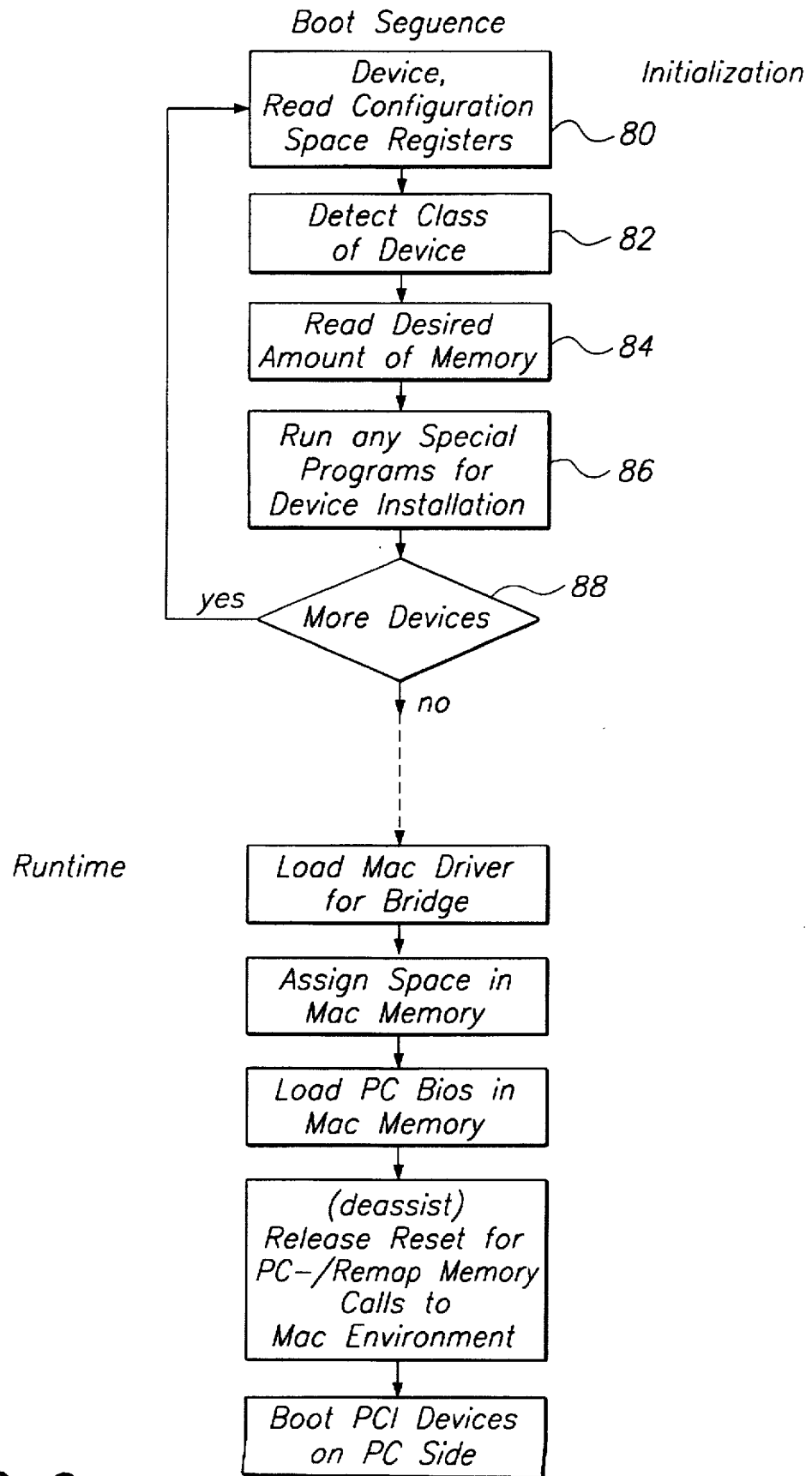
FIG. 3 illustrates the steps of a normal boot sequence for a PCI device.

Referring to FIG. 3, during initialization of the host PCI bus 54 special PCI bridge chip 66 identifies itself as something other than a traditional bridge device, including a request for allocation of some address space. In a representative implementation, this requested address space is on the order of 4 MB in extent. In one preferred implementation, the special PCI bridge chip 66 identifies itself as a memory controller or perhaps a fixed media controller.

Figure 4:
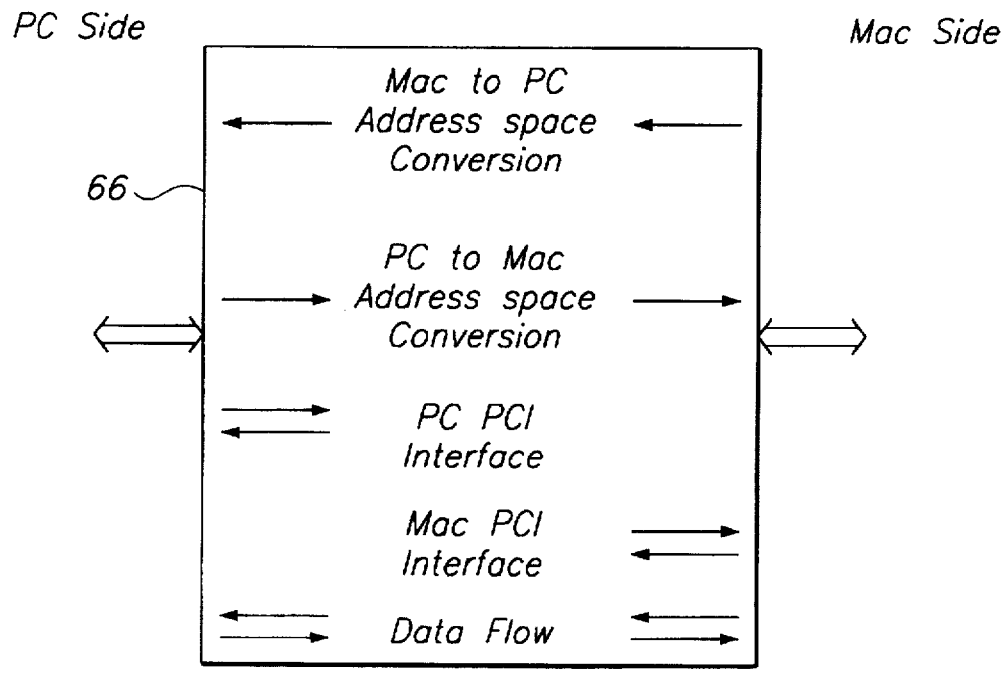
FIG. 4 illustrates some of the major blocks of a special bridge chip.

Special PCI bridge chip 66 provides several useful functions. These include address remapping between the two connected environments, and special PCI configuration functionality. Referring FIG. 4, the chip remaps Macintosh-environment addresses to PC-environment addresses as needed. The chip also remaps transactions between the Mac and PC environments. e.g. memory transactions <-> I/O transactions or burst transactions <-> compelled transactions. The chip uses a typical data path to move data from the Macintosh to the PC sides. The chip remaps PC-environment addresses to Mac environment addresses as needed, the uses a typical data path to move data from the PC to the Macintosh sides. The chip provides a special PCI interface to each environment in order to execute the methods discussed in this application. Basically, the device presents itself to the Macintosh side as a non-bridge device, preferably a memory device which simply requests allocation of some portion of PCI address space. The device presents itself to the PC side as a non-configurable device and decodes a portion of PCI address space from the PC side that has been set by the host. In general, the specific memory addresses requested from each side are independent and can differ in size and starting address.

At some point in the initialization process, a host process initiates a reset of the coprocessor and its environment. In one preferred embodiment, a driver is loaded during run time of the host processor. This driver allocates a portion of main host memory 53 for the coprocessor, loads some co-processor boot code within that memory, then sends a request to the special PCI bridge chip 66 to issue a reset to the coprocessor itself, with directions to look in the allocated host memory for boot instructions. In a preferred embodiment, the coprocessor is an x86 device from Intel Corporation, Santa Clara, Calif., or an x-86 compatible device from any of a number of well known manufacturers such as Cyrix, Austin, Tex. The coprocessor boots from BIOS code well known in the art. The coprocessor sends requests for the boot code to a specified memory location that is within its environment. The special PCI bridge chip 66 remaps the PC address to a host address according to settings in registers in the special bridge chip and issues a corresponding transaction on the host side. Data returned from the transaction can be simply returned, with swizzling to provide big endian to little endian conversion as needed.

In another preferred embodiment, the necessary host driver can be loaded during the host initialization process. Once loaded, the driver can allocate host memory as described above and initiate the sequence of events described above. If care is taken in the timing of the boot sequence, the host can load the appropriate driver and allocate main memory, load the necessary coprocessor boot information and start the initialization of the coprocessor, then continue its own host initialization sequence while the coprocessor is performing its own initialization sequence. In still another preferred embodiment, boot code can be stored in a location other than host main memory and made available to the coprocessor so the coprocessor can at least begin and possibly complete initialization before the host has completed its own initialization. For example, coprocessor boot code could be stored in non-volatile memory such as a flash ROM on the coprocessor side of the special bridge chip. Alternatively, coprocessor boot code could be stored in non-volatile memory on the host side but not in the main system memory. By managing the memory addressing in the special bridge chip, the memory space of interest on the host side can be changed such that a coprocessor call for a certain address would map to a certain host address at one time and a different host address at a different time. For example, if coprocessor boot code was stored in a special location, perhaps part of a system ROM, or perhaps part of a second PCI device, the special bridge chip could map the coprocessor address to that boot code at time of initialization and later change the same coprocessor address mapping to an entirely different host memory location, such as in main memory.

Figure 5:
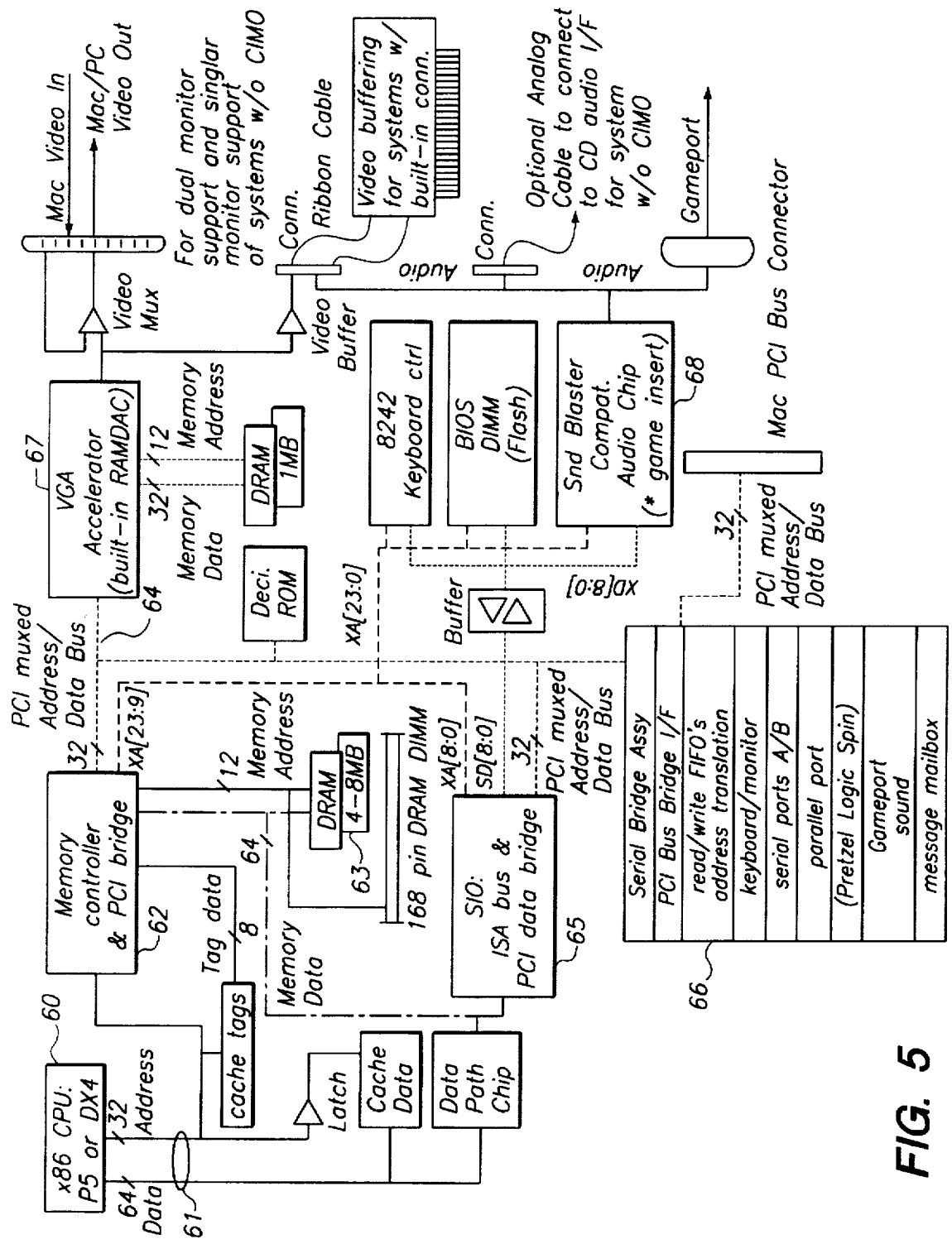
FIG. 5 illustrates a more detailed block diagram showing some of the data flow in the system of FIG. 1.

On the coprocessor side, the coprocessor system initializes much like any similar system based on such a processor. For example, if the coprocessor is an Intel Pentium chip, the initialization sequence would be typical for other systems including a Pentium chip. This process is well known to one skilled in the art. Referring to FIG. 5, part of a typical initialization sequence identifies memory control and PCI bridge 62 then begins a PCI startup sequence similar to that described above in connection with FIG. 3. The super I/O (SIO) and VGA accelerator devices are standard, commonly available parts used in other Pentium systems, and the devices respond to the PCI initialization sequence in the normal, expected way. The special PCI bridge chip 66, although connected to additional PCI devices in the first PCI environment on the host side of the system, does not provide access for the coprocessor in the second PCI environment to that first PCI environment.

The special PCI bridge chip does not respond as a configurable device on the PC side PCI bus. For all practical purposes, the bridge is a transparent device on the PC's PCI bus that provides a window into the host PCI. The range of this window (i.e. the address space—both memory and I/O) that the bridge responds to is set up by the host machine. The bridge chip positively decodes this address range on the PC's PCI bus. In general, the coprocessor or host machine will allocate the requested PCI address space. Any relevant information such as starting address can be stored as needed in registers in the special PCI bridge chip.

As discussed to some degree above, the special PCI bridge chip can map coprocessor transaction requests from the second PCI environment to corresponding addresses in the host address space in the first PCI environment. In general, these address values are unrelated to each other and will differ. It is not even required that the address ranges (extents) in the two environments be identical, although one skilled in the art can select how and what to map in either direction. It is advantageous to provide special address mapping, coupled with a special drive on the host side, to maintain information about various serial I/O, keyboard, mouse, and other system parameters and I/O on the host side in shared memory on the host so that the coprocessor can read or write information through the host I/O subsystems.

For example, a specific host memory location may be designated to hold the current position or other status of the mouse. A driver on the host side manages the information in that location. A coprocessor driver knows to look for such information by calling a certain coprocessor address location, in a process similar to managing such information from any other PCI device. A transaction directed to that coprocessor address space is remapped by the special PCI bridge chip to the corresponding host address space, allowing the transaction to complete in a manner transparent to the user. In one preferred embodiment, the coprocessor must rely on drivers on the host side to manage I/O and other shared information but the coprocessor cannot directly access the various I/O directly from the host PCI bus. In a second preferred embodiment, the coprocessor can access selected host I/O devices directly through the special PCI bridge chip. This is supported by appropriate drivers on the coprocessor side and appropriate address mapping through the special PCI bridge chip, together with management of special PCI functions as needed.

Host Processor to Second PCI Environment Device Access

In the embodiment described above, the host processor (or other device on the host side) can access coprocessor memory by a process virtually identical to the process described for the coprocessor to access host memory. The host processor can initiate a transaction directed to PCI address space for the first environment (host side) of the special PCI bridge chip. That chip remaps the address to a corresponding address in the second PCI (coprocessor) side and, in this case, the transaction would flow through PCI bridge functions of chip 62 and the memory controller functions of that same chip and ultimately to memory 63. Reads and writes to memory can be achieved in this way, and they are very similar to any other read or write transaction with an arbitrary PCI device on the coprocessor PCI bus.

The host processor (or other device on the host side) can access coprocessor PCI devices by a similar but slightly different mechanism. The transaction is initiated as above with a call to a host PCI address space assigned to the special PCI bridge chip. If that address is assigned to a coprocessor side PCI device, for example to sound controller chip 68, which includes game port support, the special PCI bridge chip translates the host-side address to a coprocessor side address for I/O and also asserts coprocessor side C/BE lines corresponding to an I/O request. From this point on, the transaction on the coprocessor side is virtually identical to a typical PCI device to PCI device transaction, returning any appropriate information to the special PCI bridge chip, which then responds appropriately to the initiating host device.

The special PCI bridge chip provides capability of programming multiple separate regions that can be remapped from the PC side to the Mac side, four regions in one preferred embodiment. These multiple translation regions can easily be extendible by replicating the translation registers and their associated decoders. The regions allow both a remapping of address and region (i.e. memory or I/O) from the PC side to the Mac side. These regions do not need to be contiguous and are allowed to overlap.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A bus bridge system for connecting independent bus environments, said system comprising:

a bus bridge device, a connection from said bus bridge device to a first bus having a first bus environment, a connection from said bus bridge device to a second bus having a second bus environment, said second bus environment compatible with said first bus environment, an address converter for remapping an address in a first one of said first or second bus environments to an address in the other of said first or second bus environments.

2. The bus bridge system of claim 1 wherein said first and second bus environments both comply with the PCI specifications.

3. The bus bridge system of claim 1 further comprising a transaction converter for remapping a transaction in a first one of said first or second bus environments to a transaction in the other of said first or second bus environments.

4. The bus bridge system of claim 1 further comprising a data path between said first and second bus environments which can be selectively activated to pass data between the environments.

5. The bus bridge system of claim 1 further comprising means to provide access for a device in said second bus environment to data in said first bus environment.

6. The bus bridge system of claim 1 further comprising a first processor in said first bus environment, a storage device in said first bus environment, connectable to said first processor and to said bus bridge device, a second processor in said second bus environment, connectable to said bridge device, means to provide access for said second processor in said second bus environment to data in said storage device in said first bus environment.

7. The bus bridge system of claim 6 wherein said data in said storage device comprises boot code for initializing said second processor.

8. The bus bridge system of claim 1, wherein:

said first bus environment is associated with a host processor; and the bus bridge system further comprises means for allowing the first of said first and second bus environments to be initialized without changing the functioning of said bus bridge device in said second bus environment.

9. The bus bridge system of claim 3, wherein the transaction converter remaps a memory transaction in the first one of said first or second bus environments to an input/output transaction in the other of said first or second bus environments.

10. The bus bridge system of claim 3, wherein the transaction converter remaps an input/output transaction in the first one of said first or second bus environments to a memory transaction in the other of said first or second bus environments.

11. The bus bridge system of claim 1, further comprising:

means for presenting the bus bridge system to a host system as a simple bus device during an initialization phase of a first one of said first and second bus environments associated with said host system.

12. The bus bridge system of claim 11, further comprising:

means for presenting the bus bridge system as a simple device to the other one of said first and second bus environments during an initialization phase of said other one of said first and second bus environments.

13. The bus bridge system of claim 11, wherein the simple bus device is a mass storage device.

14. The bus bridge system of claim 11, wherein the simple bus device is a memory device.

15. The bus bridge system of claim 11, wherein the simple bus device is a memory controller.

16. The bus bridge system of claim 11, wherein the simple bus device is a fixed media controller.

17. The bus bridge system of claim 1, wherein:

the first bus environment is associated with a host processor; and the bus bridge system further comprises means for presenting the bus bridge system as a non-configurable device to the second bus environment during an initialization phase of said second bus environment.

* * * * *